ized August 2, 1966

3,264,319
1 - OXA - 4 - HYDROXYETHYLAZASPIRO (4.4),6,7,8, 9 - TETRACHLORO - NONA - 6,9 - DIENE AND ITS SYNTHESIS
Marwan R. Kamal, Minneapolis, Minn., assignor to General Mills, Inc., a corporation of Delaware
No Drawing. Filed May 27, 1964, Ser. No. 370,688
8 Claims. (Cl. 260—307)

This invention relates to novel heterocyclic spiro compounds, the preparation thereof and to novel intermediates in the preparation thereof. In particular, the invention relates to the preparation of 1-oxa-4-hydroxyethylazaspiro (4.4),6,7,8,9-tetrachloro-nona-6,9-diene. This compound has utility as an insecticide or pesticide and has been shown to be effective against gnats.

It is therefore an object of this invention to provide the compound 1-oxa-4-hydroxyethylazaspiro (4.4),6,7,8, 9-tetrachloro-nona-6,9-diene.

It is also an object of this invention to provide a method of preparation of said compound.

It is also an object of this invention to provide novel intermediates in the preparation of said compound.

The spiro compound of this invention is prepared by the condensation of hexachlorocyclopentadiene and diethanolamine with cyclization of the condensation product. Both of the starting reactants are well known and available commercially. The reaction sequence may be illustrated as follows:

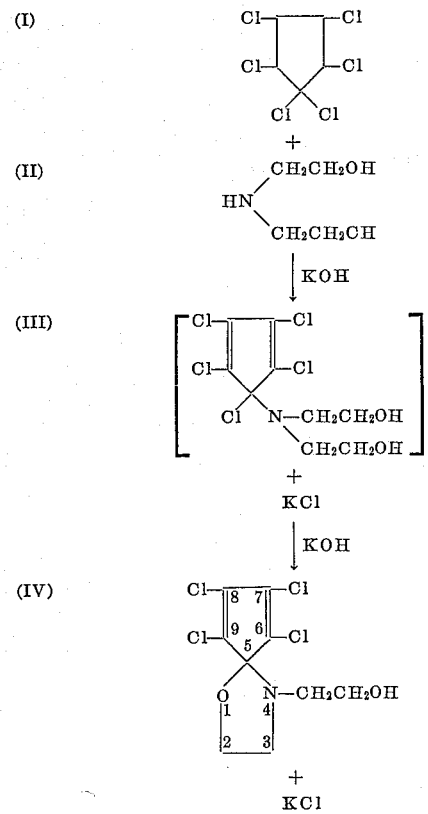

In the reaction the cyclization step apparently takes place so readily that even when a large excess of diethanolamine is used under the conditions employed, no further condensation of diethanolamine with the unisolated Compound III takes place. It may be that steric factors in Compound III contribute to the prevention of any further condensations with diethanolamine. Attempted acid hydrolysis of the oxazolidene ring in Compound IV led to a dimerized product which upon treatment with acetone and water, gave hexachloroindone.

The temperature is not particularly critical and temperatures up to the reflux temperature of the particular solvent may be employed. The temperature is preferably kept below 30° C. to avoid any possible polymerization which may occur at higher temperatures, thus reducing the yield of desired product. In general, the reaction takes from 1 to 48 hours and is preferably conducted for from 8 to 12 hours.

A strong base is generally employed in the condensation reaction. Illustrative of such strong bases are the alkali metal hydroxides and alkoxides, such as sodium and potassium hydroxide, sodium methoxide, sodium ethoxide and the like. The strong base is generally dissolved in a solvent such as isopropyl alcohol, to which solution the condensation reactants are added. Any solvent which dissolves the base and does not compete for displacement of the active chlorine of the hexachlorocyclopentadiene ring may be employed. A polar solvent is preferred. Illustrative of such solvents are the secondary and tertiary alkanols, such as, isopropyl alcohol, 2-hydroxy butanol, tertiary butyl alcohol and the like. The molar ratios of diethanolamine to the hexachlorocyclopentadiene which may be employed may vary from 1:1 to higher ratios up to 10:1. A 2:1 ratio is preferred.

The invention may be best illustrated by means of the following examples:

Example I

Potassium hydroxide (22.4 grams) was dissolved in 200 ml. of isopropanol in a 500 ml., 3-neck flask equipped with a stirrer, a thermometer and a drying tube. To the solution, there were added 42.0 g. of diethanolamine and 54.6 g. hexachlorocyclopentadiene. The mixture was then stirred for forty-eight hours while keeping its temperature below 30° C. The solvent was then removed under reduced pressure. The dark residue was dissolved in benzene and extracted several times with slightly acidic 15% sodium chloride solution. The organic phase was then washed with water. After drying over anhydrous sodium sulfate, the benzene was removed under reduced pressure and 56.0 g. of a dark oily residue remained. The oily residue was then diluted with pentane and upon cooling in an ice bath, a solid separated. After recrystallizing from pentane, a white solid, melting point 61–63° C., is obtained.

*Analysis.*—Calcd. for $C_9H_9NO_2Cl_4$: C, 35.45; H, 2.97; N, 4.59; Cl, 46.51. Found: C, 35.76; H, 3.07; N, 4.91; Cl, 45.24.

Example II

In order to illustrate the insecticidal activity of the compounds, the following formulation was made using the product of Example I.

| | Parts by weight |
|---|---|
| (1) Spiro Compound of Example I | 1.5 |
| (2) Solvent: | |
| (a) Xylene (technical) | 33.5 |
| (b) Mineral spirits (colorless) | 35.0 |
| (3) Propellant (Freon 12) | 30.0 |

The above solution was packaged in a 6 ounce aerosol can. Some of the contents were sprayed on the outside of a cap with holes on a jar containing a gnat, which allowed some of the sprayed material to reach the inside of the jar. After 30 seconds from spraying, the gnat was motionless, thus illustrating the effectiveness of the product.

While the invention has been described with reference to certain specific embodiments thereof, it will be understood that variations and modifications may be effected within the spirit and scope of the invention as defined in the appended claims.

The embodiments of the invention in which an exclusive property or privilege is claimed are defined as follows:

1. 1-oxa-4-hydroxyethylazaspiro (4.4),6,7,8,9-tetrachloro-nona-6,9-diene.
2. A process of preparing 1-oxa-4-hydroxyethylazaspiro (4.4),6,7,8,9-tetrachloro-nona-6,9-diene comprising reacting diethanolamine and hexachloropentadiene.
3. A process as defined in claim 2 in which said reaction is conducted in the presence of a strong base.
4. A process as defined in claim 3 in which said strong base is an alkali metal hydroxide.
5. A process as defined in claim 3 in which said strong base is potassium hydroxide.
6. A process as defined in claim 3 in which said strong base is sodium hydroxide.
7. A process as defined in claim 2 in which said reaction is conducted in the presence of a strong base dissolved in an unreactive solvent.
8. A process as defined in claim 7 in which said solvent is isopropyl alcohol.

References Cited by the Examiner
UNITED STATES PATENTS

| | | | |
|---|---|---|---|
| 2,828,340 | 3/1958 | Dickinson et al. | 260—563 |
| 2,960,508 | 11/1960 | Croxall et al. | 260—307 |
| 3,030,375 | 4/1962 | De Gray et al. | 260—307 |
| 3,037,908 | 7/1962 | Margot | 167—33 |
| 3,067,095 | 12/1962 | Baltazzi | 167—33 |
| 3,068,286 | 12/1962 | Brindell | 260—563 |
| 3,136,764 | 6/1964 | McBee | 260—563 |

HENRY R. JILES, Acting Primary Examiner.

R. J. GALLAGHER, Assistant Examiner.